(12) United States Patent
Goehlich

(10) Patent No.: US 6,784,371 B2
(45) Date of Patent: Aug. 31, 2004

(54) DETECTING SUBSTANCE INTRUSION IN A CABLE

(75) Inventor: Lothar Goehlich, Berlin (DE)

(73) Assignee: Pirelli Kabel und Systeme GmbH & Co. KG, Berlin (DE)

(*) Notice: Subject to any disclaimer, the term of this patent is extended or adjusted under 35 U.S.C. 154(b) by 0 days.

(21) Appl. No.: 10/305,154

(22) Filed: Nov. 27, 2002

(65) Prior Publication Data
US 2003/0098175 A1 May 29, 2003

(30) Foreign Application Priority Data
Nov. 28, 2001 (EP) .............................. 01127478

(51) Int. Cl.$^7$ ................................................ H01B 7/00
(52) U.S. Cl. ..................................... 174/110 R; 174/36
(58) Field of Search ...................... 174/110 R, 110 PM, 174/110 D, 113 R, 120 R, 121 R

(56) References Cited

U.S. PATENT DOCUMENTS

| | | | | |
|---|---|---|---|---|
| 4,386,231 A | * | 5/1983 | Vokey | 174/115 |
| 5,209,987 A | * | 5/1993 | Penneck et al. | 428/610 |
| 5,235,286 A | * | 8/1993 | Masia et al. | 324/522 |
| 6,424,768 B1 | * | 7/2002 | Booth et al. | 385/102 |
| 6,566,604 B2 | * | 5/2003 | Booth et al. | 174/110 R |
| 2002/0041744 A1 | * | 4/2002 | Anelli et al. | 385/112 |

FOREIGN PATENT DOCUMENTS

| | | | | |
|---|---|---|---|---|
| DE | 1 490 609 | | 7/1969 | |
| DE | 1 490 609 A | * | 7/1969 | |
| DE | 19527972 | | 1/1997 | |
| DE | 19544391 | | 5/1997 | |
| EP | 0 361 863 | | 4/1990 | |
| EP | 0 361 863 A1 | * | 4/1990 | ............ H01B/7/28 |
| GB | 2 275 555 A | * | 8/1994 | ............ G01M/3/16 |
| GB | WO 97/11391 | * | 3/1997 | ............ G01V/1/20 |

* cited by examiner

Primary Examiner—William H. Mayo, III
(74) Attorney, Agent, or Firm—Finnegan, Henderson, Farabow, Garrett, & Dunner, L.L.P.

(57) ABSTRACT

A cable has a cable core, an inner cable sheath, an outer sheath, and a sensor. The sensor may extend along the cable for detecting a detectable substance inside the cable. In addition, the sensor may be arranged between the inner cable sheath and the outer sheath for detecting such substance outside the inner cable sheath. Furthermore, the cable may include a structured material between the inner cable sheath and the outer sheath arranged to allow any detectable substance entering between the inner cable sheath and the outer sheath to travel along the perimeter of the inner cable sheath to reach the sensor. The structured material may be configured to create at least one interstice between the inner cable sheath and the outer sheath. The at least one interstice may be configured to collect at least a portion of the detectable substance and to be intersected by the sensor. The structured material may be configured to restrict travel of the detectable substance in a longitudinal direction of the cable to a short distance.

20 Claims, 4 Drawing Sheets

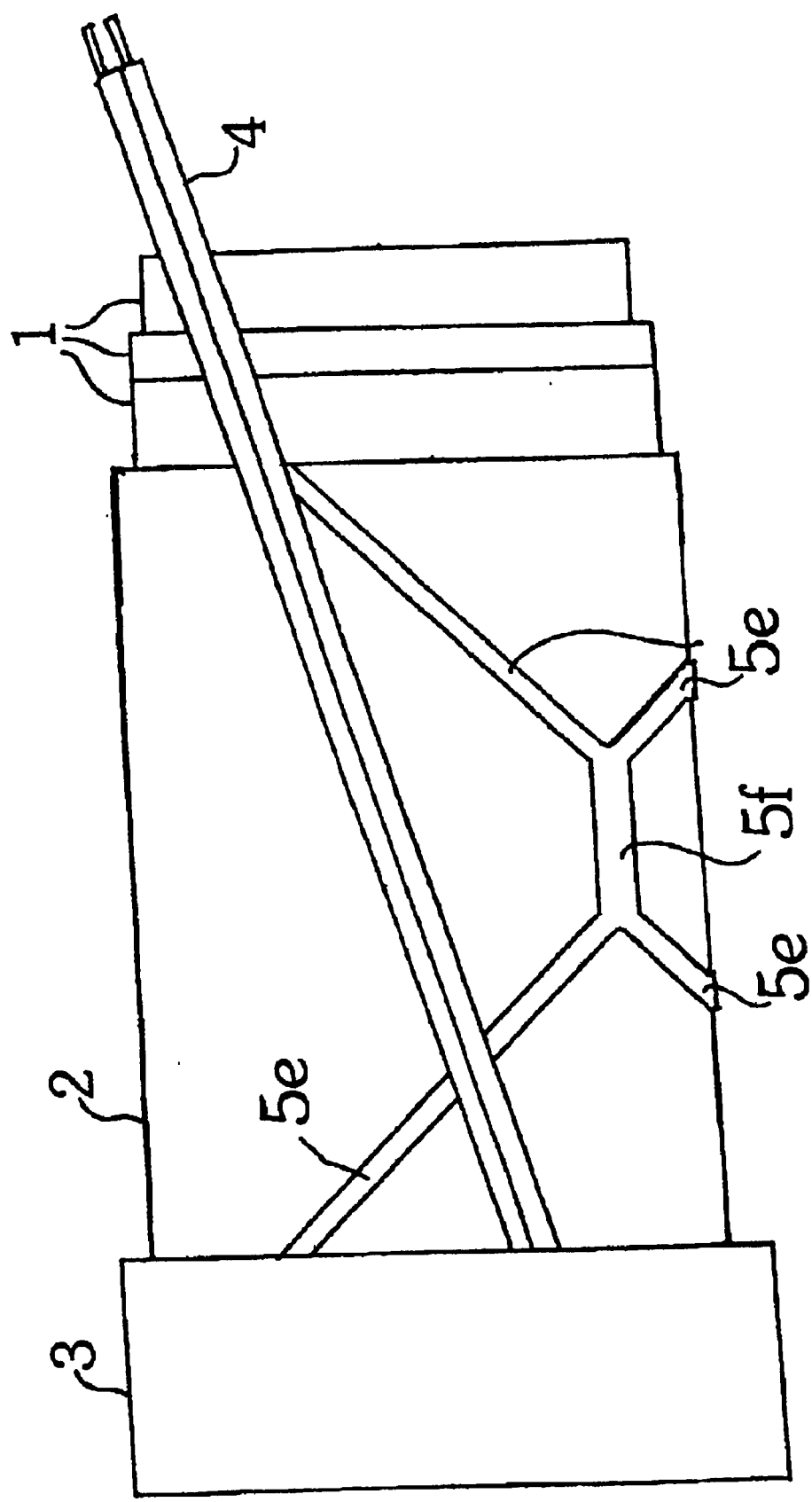

DETECTING SUBSTANCE INTRUSION IN A CABLE

RELATED APPLICATION

Applicant claims the benefit of European Application No. 01 127 478.4, filed Nov. 28, 2001.

FIELD OF THE INVENTION

The present invention relates to a cable like a power cable, a copper telecoms cable, a fibre optical cable or the like and in particular, the present invention relates to a cable, which comprises a cable core, an inner cable sheath, an outer sheath and a sensor, which is extending along the cable for detecting a detectable substance like water inside the cable.

In such a cable conditions can occur in which substances like water intrude through the partially damaged outer sheath and such substance travels between the inner cable sheath and outer cable sheath in longitudinal direction leading to damage of the cable by chemical and electro-chemical effects in a much larger cable section than the section of the partial damage of the outer sheath and inaccurate substance intrusion measurements. The invention particularly addresses these problems in order to limit damaged areas and to increase the measurement accuracy and lifetime of the cable.

BACKGROUND OF THE INVENTION

Cables like power cables, copper telecoms cables, fibre optical cables or the like very often comprise a cable core, an inner cable sheath, and an outer cable sheath around that inner cable sheath. Typically, a cable core of copper telecoms cable includes at least two copper wires insulated against each other and commonly insulated in addition. Furthermore, depending on the type of cable, a screen might build in. Typically, a cable core of fibre optical cables is generally similarly constructed as the copper cable but including optical fibres instead of copper wires. Typically, a cable core of a high voltage transmission cable comprises a conductor and a screen surrounding that conductor. Furthermore, independent of the type of cable, such cables very often are provided with an insulating and water-proof outer coating. In order to avoid the entry of water or water vapours through the outer coating to the cable core the outer coating preferably consists of metal or a metal sheet as an inner sheath in combination with an outer layer of PE or PVC as an outer sheath (layer coating).

Cables are used to distribute communication data or electric power, which both have to be transported to the end users. Because of limited space, especially in the cities cables are often subject to third party damage during installation work on site. In many cases the damage only happens to the cable sheath without effecting the electrical function of the cable core. If this damage remains undetected, water (or other substance) ingress to the sheath will cause an electrical damage by the time. Cables with metal laminated plastic sheaths can be fitted with water sensors, which are integrated in the screen area of the cable inside the inner sheath of the cable. These sensors stay dry as long the inner cable sheath is tight. In case of a damage of the outer and inner sheath the sensors get wet and change their electrical resistance regarding the screen. By monitoring the insulation resistance of the sensors the water ingress can be detected and located. In cases of cables with a tube-type metal sheath—in contrary to a metal foil, as mentioned above —it is very often of a major interest to protect the metal sheath as this is the main barrier to the cable core against water. Such cables can have a dry-type plastic insulation or be paper insulated and oil filled. With respect to oil filled cables a tight metal sheath is of special interest because such cables are under internal pressure and will fail immediately under decreasing oil pressure and pollute the environment in case of a damage. The protection of the metal sheaths mostly are performed by plastic sheaths. In case of mechanical damage of this plastic sheath, the metal sheath can be subject of corrosion and can fail later. The avoidance of, for example, water intrusion is of particular significance, since intruded water accelerates the aging processes of the insulating materials of the cable made of cross-linked polyethylene and thus leads to an early damage or failure of the cable.

Water sensors and a monitoring system already known can prevent this chain of failures by detecting the presence of water on the metal sheath. Water monitoring systems are used in order to detect the water intrusion into the cable and to determine the location of the water intrusion. Typically, one or more water sensing wires are provided in the cable core screen. The water sensing wire extends in the screen either parallel to the cable core or is wound around the cable core. A measuring circuit performs voltage drop measurements at the water sensing wire or water sensing wires because a water intrusion into the cable will cause a change of the isolation resistance of the water sensing wire and thus different voltage drops at the water sensing wire. In order to perform the voltage drop measurements typically the measuring circuit injects a measuring current into the water sensing wire. Such a monitoring system can not detect a damage of the outer sheath before the inner sheath will be damaged additionally.

To avoid travelling of water along the cable between the inner cable sheath and the outer sheath it is also known to use swellable compounds in the form of tapes applied between the cable core and a sheath in order to prevent ingress of water into the respective interstice. Such swellable tapes are typically made out of water blocking swelling nonwoven fabric, capable to increase its size in contact with water. Such tapes can avoid the intrusion of water for some time but are not a long term solution. Therefore information regarding water intrusion is still necessary.

DESCRIPTION OF THE PRIOR ART

In the German patent applications DE 195 44 391 A1 and DE 195 27 972 Pirelli describes a water monitoring system for a three-phase power transmission system. Each of the three cables has a respective water sensing wire and the three sensing wires are connected at the cable beginning and the cable end through serially connected measurement and termination resistors. At the cable end the common connection node is connected to ground via a load resistance. At the cable beginning a DC voltage source is connected between the common connection point at the cable beginning and ground. Also the screens are connected to ground. The DC currents flowing in the water sensing wires constitute a measure for the presence or absence of a water intrusion and also a measure for the location of the water intrusion.

The cable shown in DE 195 27 972 has the sensor wire applied within the screen inside the inner metal sheath. With such arrangement water intrusion inside the inner cable sheath can be detected.

SUMMARY OF THE INVENTION

As explained above, in a cable conditions can occur in which substances like water intrude through the partially damaged outer sheath and possibly travels between the inner cable sheath and outer cable sheath in longitudinal direction leading to later damage of the inner sheath over a longer distance and leading to inaccurate substance intrusion measurements and damage of the cable by chemical and electrochemical effects in a much larger cable section than the section of the partial damage of the outer sheath.

It is therefore a primary object of the present invention, to provide a cable which meets the requirements of detecting water in the interstice between outer sheath i.e., plastic) and inner sheath (i.e., metal or plastic).

This object is solved by a cable comprising a cable core, an inner cable sheath, an outer sheath and a sensor, which is extending along the cable for detecting a detectable substance inside the cable.

According to the invention, (claim 1) the sensor is arranged between the inner cable sheath and the outer sheath for detecting such substance outside the inner cable sheath.

Such cable according to the present invention, for example may be a power cable, a copper telecom cable, and a fibre optical cable.

Such arrangement of the sensor or sensors between the inner cable sheath and the outer sheath and a monitoring system allow the detection of a damage of the outer sheath even if the inner sheath is not damaged, i.e. allows detection of the presence of water on the metal sheath.

As the water sensors are around the cable core and cover only a small part of the circumference, the water entered to the damaged sheath must be able to travel to the sensors in order to get them wet. Thus a water tight interlayer by means of a compound (as mentioned above) between the metal sheath and the plastic sheath is not appropriate. On the other hand a gap between the two sheaths as well must be avoided because of necessary water blocking in order to prevent travelling of water along the interstice between the plastic and the metal sheath.

If in a cable using an above mentioned water monitoring system according to the primary aspect of the invention, additionally a swellable tape is used, there are many sensor wires in parallel necessary to steadily detect water intrusion. Therefore using such swellable tapes applied between the cable core and a sheath makes it impossible or at least very expensive to use in parallel a water monitoring system.

High friction or bonding between the inner and outer sheaths is important to allow for mechanically stability in case of pulling during the laying process of the cable. However, using an above mentioned swellable tape as an additional layer between the inner and outer sheaths decreases significantly the friction between those sheaths.

As explained above, in a cable conditions can occur in which substances like water intrude through the partially damaged outer sheath and in the same way as such substance travels to the sensing wire (in accordance with embodiments of the present invention) it travels between the inner cable sheath and outer cable sheath in longitudinal direction leading to inaccurate substance intrusion measurements and damage of the cable by chemical and electro-chemical effects in a much larger cable section than the section of the partial damage of the outer sheath.

It is therefore a secondary object of the present invention, to provide a cable which meets the requirements of detecting water in the interstice between outer sheath i.e., plastic) and the inner sheath (i.e., metal or plastic) and at the same time blocking of substances like water not to enter the interstice of the two layers along the cable.

This secondary object is solved by a preferred embodiment of a cable according to the invention, which comprises a structured material between the inner cable sheath and the outer sheath arranged to allow that detectable substance, which occasionally could enter between the inner cable sheath and the outer sheath through a damaged section of the outer sheath, traveling along the perimeter of the inner cable sheath to reach the sensor but restrict traveling of said detectable substance in longitudinal direction of the cable to a short distance hereby covering a continuous part of the surface area of the inner cable sheath allowing contact friction between said inner cable sheath and said outer sheath at the not covered parts of said inner cable sheath. In case of a sheath damage which has effected at least the outer sheath and water ingress to that damage has taken place, the water also will enter into the interstice between the two sheaths. By the time the water will spread in circumference as well as longitudinal, thus wetting the sensor (which might be a two wire sensor, well known to those skilled in the art) and causing alarm of the monitoring system. Because of the structured material between the inner cable sheath and the outer sheath the propagation of water in the circumference will be almost totally but in longitudinal direction will be only very small. However the part of wetted cable will be big enough to generate an alarm.

"Structured material" in this sense signifies a material which has a specific structure regarding the top view of the material which makes it capable to fulfill the above mentioned requirements regarding the detectable substance when build in a cable. Therefore such "structured material" may include one type of material but also may include different types of material, which all together as fulfill said requirements. Furthermore, the construction of such "structured material" may be based on one continuous part as well as based on two or more parts, which for example may be connected, adherent, overlapped and/or contacted, respectively.

The shape of the area of the inner cable sheath which is free of structured material can be of any kind which forms a border of a closed circumference.

The structured material may include at least two stripe shaped sections with changing distance to each other side by side around the perimeter of the inner cable sheath and frequently connecting each other in short distances in longitudinal direction of the cable. Such a structure can be easily realized during a production process of a cable wherein the at least two strip shaped sections are separating water in both, the longitudinal direction and the direction of the perimeter of the cable.As smaller the absolute value of the angles between the longitudinal direction of the cable and each of this at least two stripe shaped sections, as less material is necessary to build a given cross section of such material per length unit of a cable. However, on the contrary also as smaller the absolute value of the angles between the longitudinal direction of the cable and each of this at least two stripe shaped sections, as longer are the "small distances" in longitudinal direction between the connecting sections of this stripe shaped sections, that means, as longer are the distances, an intruding substance like water can travel in longitudinal direction. Therefore those skilled in the art will find an appropriate compromise between the material consumption and the amount of longitudinal distance an intruding substance like water may travel.

The short distances are shorter than one meter to allow an appropriate accuracy of damage detection. The short distances are in the order of magnitude of the circumference of the cable or shorter to allow a high accuracy of damage detection even if the structured material itself is partly damaged. The detectable substance may comprise water.

The structured material may comprise swellable material. Such material, for example comprising a water blocking swelling nonwoven, if in contact with water may increase its size and thereby increase the caulking effect by absorbing the water as an additional effect.

The structured material may comprise a self adhesive material, adhesive on at least one side. The structured material may also comprise one sided adhesive tapes or double sided adhesive tapes as well as adhesives, which may be sputtered ore otherwise put onto the outer surface of the inner cable sheath during the production process of the cable before extrusion of the outer sheath. Such tape can for example be out of a sticky plastic, e.g. foamed under-cross-linked acrylic material. Such adhesives can be each adhesive, which is resistant against the substance to be detected (like water) and which is adhesive to the used material of the inner and/or outer sheath, like adhesives based on for example acrylate polymers, methacrylate polymers, polyurethans, silicons, epoxy resins and the like. In case of using a double sided adhesive material the two sheaths are bonded together and are able to seal the interstice between the cable sheaths as well as to allow to increase the friction or bonding between the sheaths. "Self adhesive material" in the sense of this invention includes material which can also be made adhesive by a following extrusion process for extruding the outer sheath.

The structured material may also comprise at least one first tape being helix shaped wound around the inner cable sheath. Such kind of applying a part of the structured material according to the invention is very easy to realize during the production process of a cable.

The structured material may also comprise at least one further tape. According to such embodiment of the present invention it is easily possible to create closed sections by covering a continuous part of the surface area of the inner cable sheath, having the at least two tapes frequently overlapped.

The further tape may be helix shaped wound around the inner cable sheath with an opposite spinning direction to that of the first tape. A structured material according to such embodiment of the present invention allows a symmetrical distribution of friction between the sheaths of the cable.

The further tape is mainly longitudinally arranged on said inner cable sheath. A structured material according to such embodiment of the present invention is very easy to realize during the production process of a cable. Furthermore the material consumption of such structured material is less than that of the latter version.

The structured material may comprise a sputtered adhesive and sealing material. A sputtering processes according to such embodiment of the present invention, which uses for example fixed or movable (around the inner sheath) cannulas or nozzles for applying adhesives on the inner cable sheath before extrusion of the outer sheath to create a structured material in accordance with the present invention, is a very appropriate production technique.

The structured material may comprise at least one tape and one stripe shaped sputtered adhesive material. Using a material mix according to such embodiment of the present invention and therewith using different production processes may allow the usage of a combined tool and save one production step, i.e. one time consuming moving of the semi-finished product.

The least one of said tape and stripe shaped sputtered material may be helically shaped. A structure of a part of a structured material according to such embodiment of the present invention can easily be realized by a rotating sputter tool rotating around the inner sheath of a cable, which is at the same time longitudinally moved.

One of said tape and stripe shaped sputtered material is longitudinally arranged. Such a preferred embodiment according to the present invention allows a combination of one static production step of one technique with one moving production step of the other technique, both applied on the inner sheath of a cable, which is at the same time longitudinally moved. Here it may be preferable to apply an approximately longitudinal stripe shaped sputtered adhesive material on the inner sheath and wind a tape around it. A cable according to this embodiment of the present invention may have higher flexibility in case the helically wound tape is not adhesive on both sides, allowing more friction between the inner sheath and the outer sheath. According to an other preferred embodiment according to this aspect of the invention it may be also preferable, to apply a stripe shaped sputtered adhesive material by for example a nozzle, which rotates approximately 360° around the inner cable sheath and for example changing the movement direction each approximately 360° and additionally putting a tape approximately longitudinally along the inner cable sheath (for example overlapping the area, where the nozzle changes its direction after approximately 360° rotating movement).

The structured material comprising sputtered adhesive and sealing material, may be divided in at least two stripe shape sections side by side around the perimeter of the inner cable sheath with changing distance to each other along the cable and being formed as a short longitudinally arranged section when connected to each other. Such structure (i.e. shape) of a structured material according to this embodiment of the present invention can easily be realized for example by using two nozzles or cannulas, each of which is moved approximately 180° around the inner cable sheath and each of which for example changes its movement direction each approximately 180° both thereby moving always in opposite directions and connecting the sputtered adhesive and sealing material applied by both nozzles or cannulas when changing their movement directions.

The before mentioned embodiments of the invention advantageous provide economical applications of for example swellable or adhesive material like tapes ore sputtered material to realize cable designs with a sensor to protect the main sheath (inner sheath) and at the same time allow for mechanical stability in case of pulling during the laying process of the cable.

Further advantageous embodiments and improvements of the invention are listed in the dependent claims appending to the description. Furthermore, it should be noted that the disclosure presented herein only lists the preferred mode of the invention and should not be understood as limiting in any way. That is, a skilled person can carry out modifications and variations of the invention on the basis of the teaching of the present specification. In particular, the invention can comprise embodiments which result from an individual combination of features which have been described separately in the description and the claims.

BRIEF DESCRIPTION OF THE DRAWINGS

In the drawings the same or similar reference numbers denote the same or similar parts and steps throughout the specification.

FIG. 4 shows a fourth embodiment of a cable in accordance with the present invention.

DETAILED DESCRIPTION

Hereinafter, the preferred mode of the invention as presently conceived by the inventors will be described. However, it should be understood that other modifications and variations of the invention are possible on the basis of the teachings herein.

Figure 1:
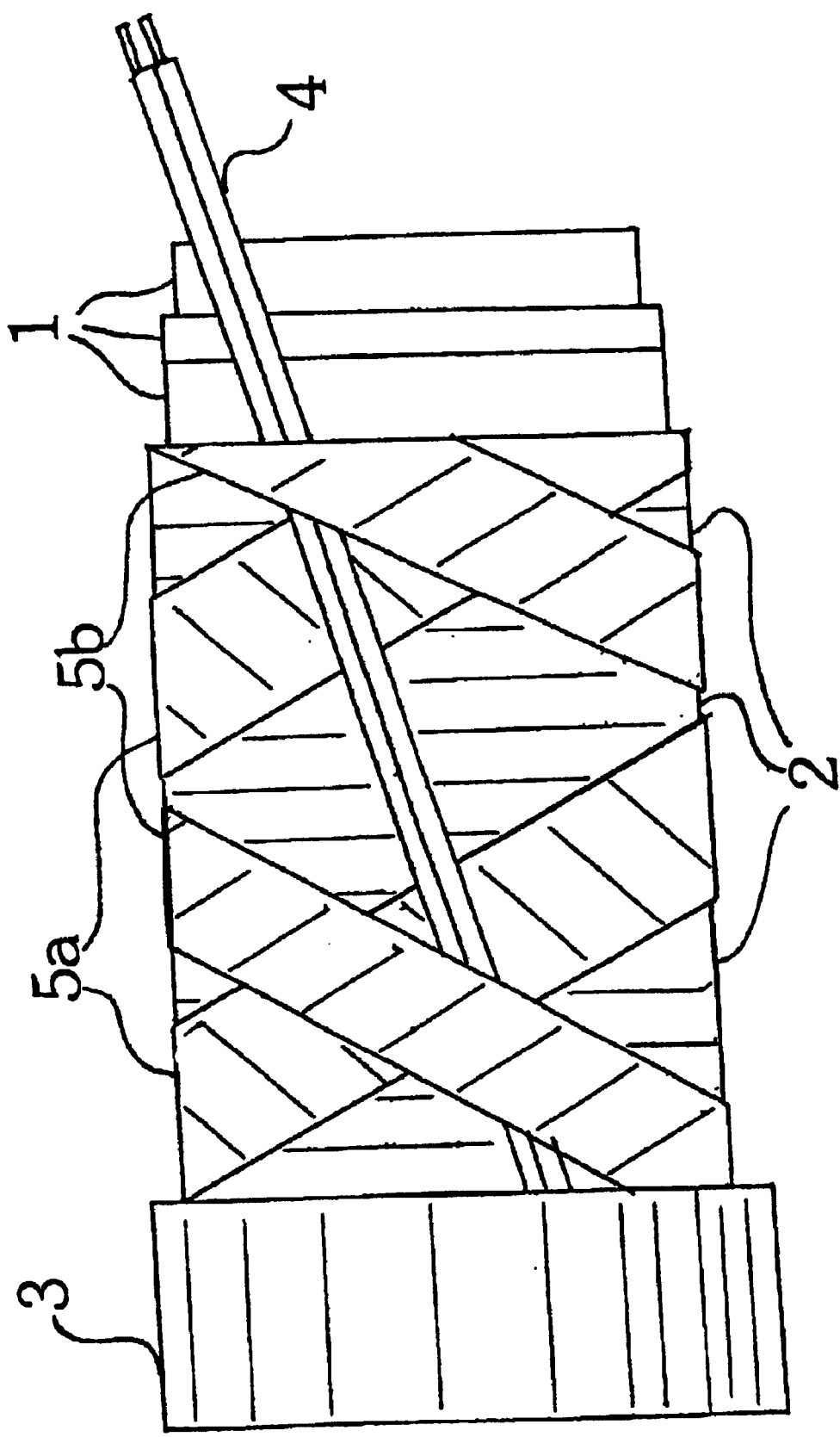
FIG. 1 shows a first embodiment of a cable in accordance with the present invention.

FIG. 1 shows a first embodiment of a cable according to the present invention containing a water sensor in a water tight interlayer.

In particular FIG. 1 shows a cable core 1 on the right side of each of the FIGS. 1 to 4. An inner cable sheath 2 made out of metal or plastic or both of them is put around the cable core 1 to protect it against mechanical damage, water and the like (shown in the middle section of the FIGS. 1 to 4). An inner swellable tape 5a is wound around the inner cable sheath 2 in a first spinning direction. A water sensor 4 is wound around the inner cable sheath 2 and the inner swellable tape 5a for detecting water on the outer surface of the inner cable sheath 2. An outer swellable tape 5b is wound around the inner cable sheath 2, the inner swellable tape 5a and the water sensor 4 in a second spinning direction opposite to the first spinning direction. An outer plastic sheath 3 (shown on the right side in FIGS. 1 to 4) is covering the whole before mentioned construction and may be for example extruded on the inner sheath 2 with the tapes 5a, 5b and the sensor 4 wound around.

In the embodiment of FIG. 1 two tapes 5a, 5b are wound around an inner cable sheath 2, each tape 5a, 5b in opposite spinning direction. Thus the tapes 5a, 5b are overlapping while forming rhombus like geometrical interstice.

In case of a sheath damage which has effected the outer sheath 3 water will enter the interstice between the inner cable sheath 2 and the outer sheath 3. By the time the water will spread in circumference as well as longitudinal, thus wetting the sensor 4 and causing alarm of a monitoring system. Because of the structured material formed by the swellable tapes 5a and 5b, which are tending to increase their size in contact with water and thereby tightening the interstice between the inner and outer sheath 2, 3 in the interstice the propagation of water in the circumference will be almost totally but in longitudinal direction will be only very small.

Figure 2:
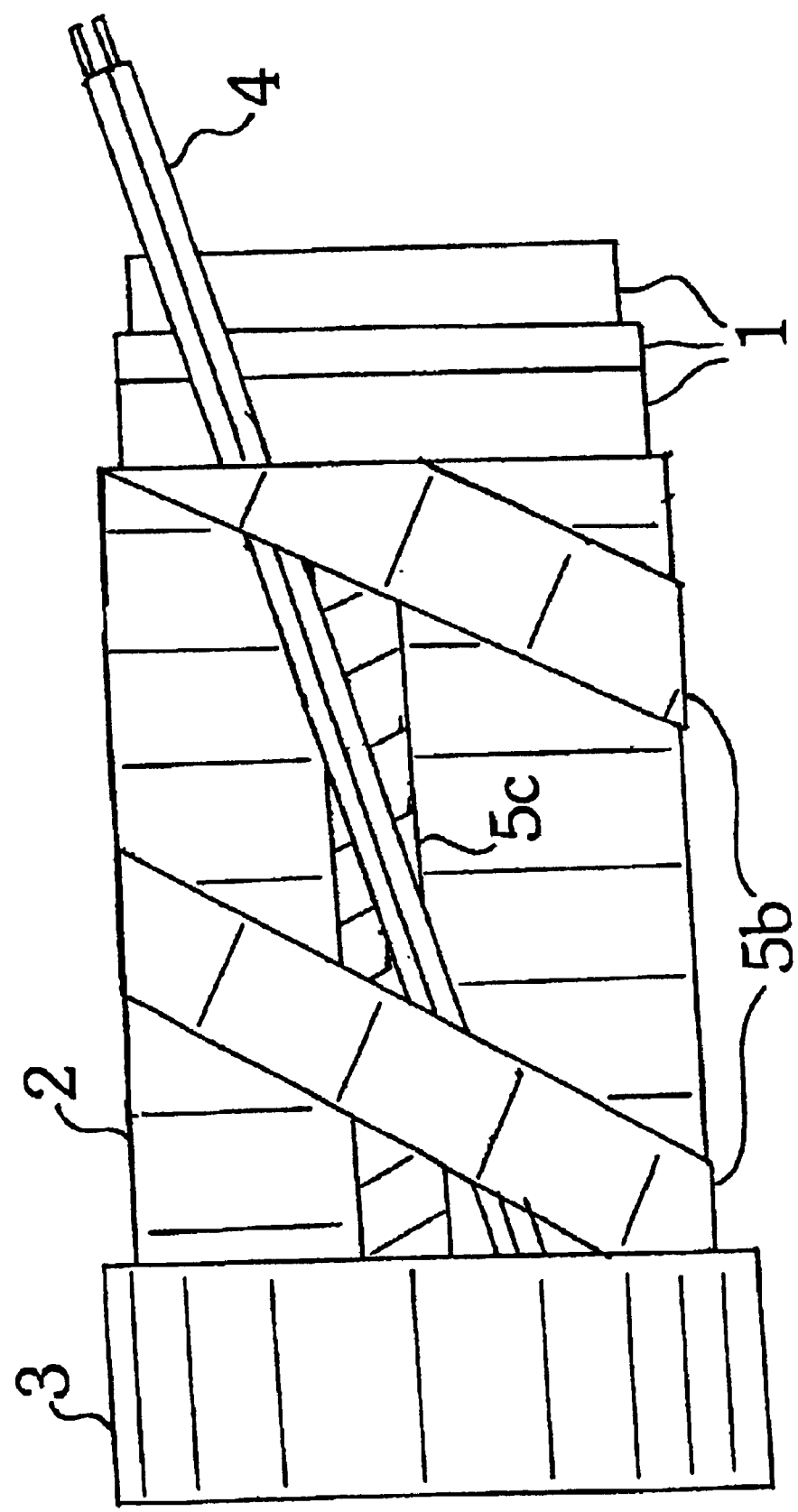
FIG. 2 shows a second embodiment of a cable in accordance with the present invention.

FIG. 2 shows one second embodiment of a cable according to the present invention containing a water sensor in a water tight interlayer.

In particular FIG. 2 shows a cable core 1. An inner cable sheath 2 is put around the cable core 1 to protect it against mechanical damage, water and the like. An inner swellable tape 5c is longitudinally arranged on the inner cable sheath 2. A water sensor 4 is wound around the inner cable sheath 2 and the inner swellable tape 5c for detecting water on the outer surface of the inner cable sheath 2. An outer swellable tape 5b is helically wound around the inner cable sheath 2, the inner swellable tape 5c and the water sensor 4. An outer sheath 3 is covering the whole before mentioned construction.

In the second embodiment of FIG. 2 one tape 5b is wound around an inner cable sheath 2 and one tape 5c is longitudinally arranged on the inner cable sheath 2. Thus the tapes 5b, 5c are overlapping while forming rhombus like geometrical interstice. The functionality of the structured material, formed by the tapes 5b and 5c according to the second embodiment is almost the same as that of the structured material, formed by the tapes 5a and 5b according to the first embodiment mentioned above.

Figure 3:
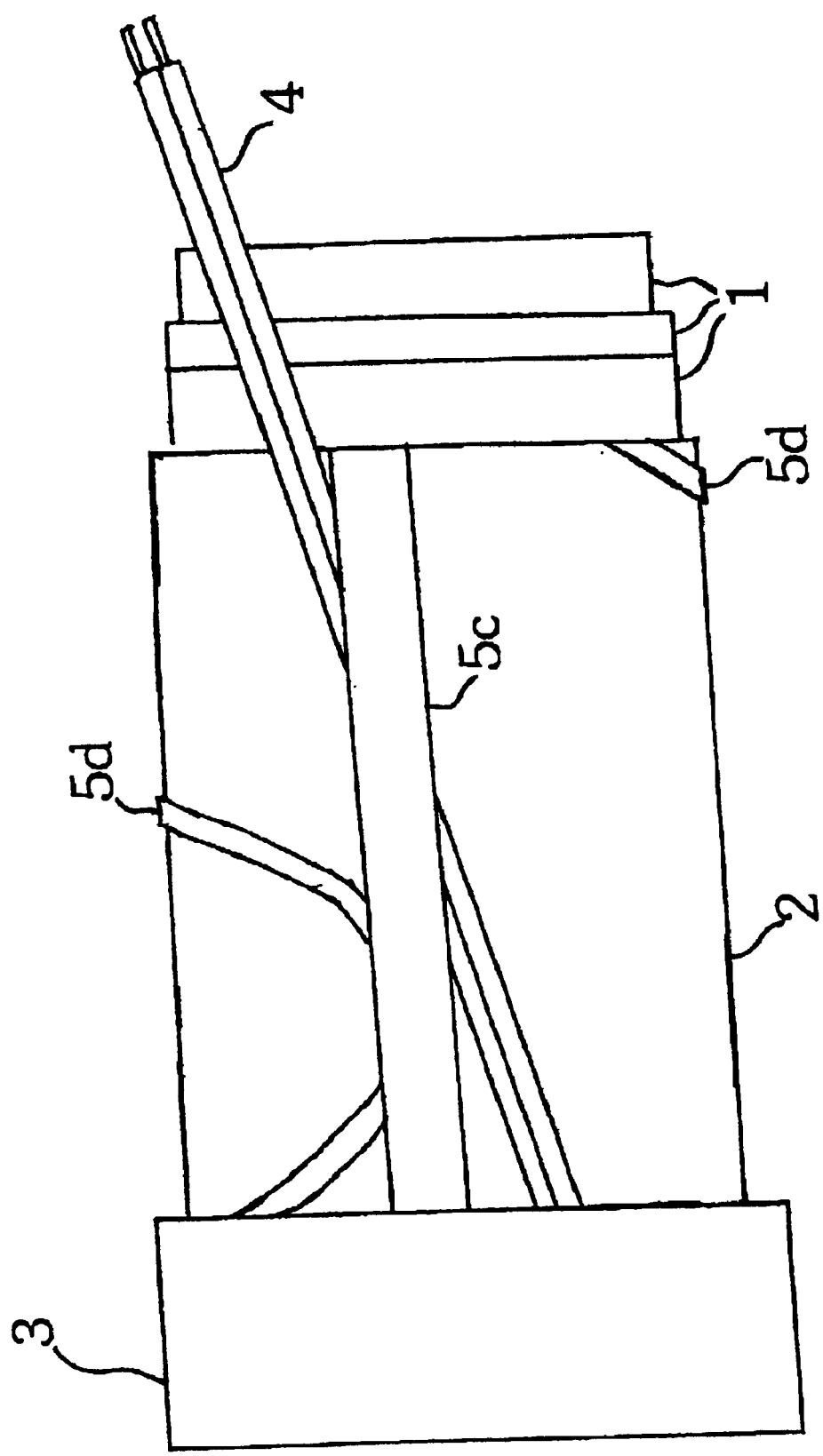
FIG. 3 shows a third embodiment of a cable in accordance with the present invention.

FIG. 3 shows a third embodiment of a cable according to the present invention containing a water sensor in a water tight interlayer.

In particular FIG. 3 in the same way as the foregoing Figures shows a cable core 1. An inner cable sheath 2 is put around the cable core 1 to protect it against mechanical damage, water and the like. A stripe shaped sputtered adhesive material 5d is applied on the inner cable sheath 2, for example by a nozzle, which rotated approximately 360° around the inner cable sheath 2 and changed its movement direction each approximately 360° while the cable itself is moved in longitudinal direction. A water sensor 4 is wound around the inner cable sheath 2 and the stripe shaped sputtered adhesive material 5d for detecting water on the outer surface of the inner cable sheath 2. An adhesive tape 5c is longitudinally arranged on the inner cable sheath, the stripe shaped sputtered adhesive material 5d (where the nozzle had changed its direction) and the water sensor 4. An outer sheath 3 is covering the before mentioned construction completely (only partly shown on the left side of FIG. 3).

While in the two before mentioned embodiments the structured material has been a swellable material, in this third embodiment of the present invention the structured material is build out of two different adhesive materials 5c, 5d. In the third embodiment of the present invention the inner sheath 2 and the outer sheath 3 are tightly connected by the adhesive effect of the structured material namely the adhesive tape 5c and the sputtered stripe shaped material 5d. Therefore any substance like water, which will enter the interstice between the inner and outer sheath 2, 3 will be limited in its spreading movement to the closed section not covered by the structured material. In an amended version of the third embodiment, if the tape 5c is not an adhesive tape but a swellable tape like the one of FIG. 2, a similar effect regarding occasionally intruding water will be achieved but the flexibility of the cable might be higher.

FIG. 4 shows a forth embodiment of a cable according to the present invention.

In particular FIG. 4 shows a cable core 1. An inner cable sheath 2 is put around the cable core 1 to protect it against mechanical damage, water and the like. A stripe shaped sputtered adhesive material 5e, 5f being divided in at least two stripe shape sections 5e side by side around the perimeter of the inner cable sheath 2 with changing distance to each other along the cable and being formed as a short longitudinally arranged section 5f when connected to each other is applied on the inner cable sheath 2. A water sensor 4 is wound around the inner cable sheath 2 and the stripe shaped sputtered adhesive material 5e, 5f for detecting water on the outer surface of the inner cable sheath 2. An outer sheath 3 is covering the whole before mentioned construction.

The comparison of a monitored cable comprising a sensor and sealing arrangement according to the present invention with an armoured cable which prevents the damage of the metal sheath by measures of construction, shows that such armoured cable has to be much bigger, can allow only a smaller length on a drum, needs more joints, has a deteriorated current carrying capacity because of bigger dimensions and totally will be more expensive.

It may be noted that although the water sensor in the embodiments of the FIGS. 1 to 4 is wound around the inner cable sheath 2 and the inner swellable tape 5a those skilled in the art will appreciate that it can be either directly positioned on the inner sheath, on the first tape or on all tapes. The kind of winding of the water sensor can be conventional in a helix (as shown in FIG. 1), but also in SZ-type with changing spinning direction, straight in a line or straight in alternating line. Instead of a water sensor any other kind of sensor can be applied in the interstice of the two cable sheaths. Additionally, although in the first, second, third and fourth embodiment a two wire sensor 4 is shown those skilled in the art will appreciate that it can be also a one wire sensor in case the inner sheath 2 or the outer sheath 3 comprise conductive material and can be used as one measurement conductor for example.

Furthermore, it may be noted that although the tapes applied in the first second and third embodiments are made out of swellable material the invention is not restricted to such tapes. Additionally such tapes may be made out of a sticky plastic, e.g. foamed under-cross-linked acrylic material. In that case the two sheaths are bonded together and are able to seal the interstice between the cable sheaths as well as to allow to increase the friction or bonding between the sheaths in the same manner as by the sputtered adhesive material of the third and fourth embodiment.

Furthermore, it should be noted that the invention is not restricted to the above description of the best mode of the invention as presently conceived by the inventors. That is, various variations and modifications of the invention may be carried out on the basis of the above teachings. In particular, the invention may comprise embodiments, which result from the combination of features which have been individually and separately described and claimed in the description, the figures and the claims.

Reference numerals in the claims only serve clarification purposes and do not limit the scope of these claims.

What is claimed is:

1. A cable comprising:
   a cable core;
   an inner cable sheath;
   an outer sheath;
   a sensor which extends along the cable for detecting a detectable substance inside the cable, the sensor being arranged between the inner cable sheath and the outer sheath for detecting such substance outside the inner cable sheath; and
   a structured material between the inner cable sheath and the outer sheath arranged to allow any detectable substance entering between the inner cable sheath and the outer sheath to travel along the perimeter of the inner cable sheath to reach the sensor, the structured material configured to create at least one interstice between the inner cable sheath and the outer sheath, the at least one interstice being configured to collect at least a portion of the detectable substance and to be intersected by the sensor, the structured material configured to restrict travel of the detectable substance in a longitudinal direction of the cable to a short distance.

2. The cable according to claim 1, wherein said structured material comprises at least two stripe shaped sections with changing distance to each other side by side around the perimeter of the inner cable sheath and frequently connecting each other in short distances in longitudinal direction of the cable.

3. The cable according to claim 2, wherein the short distances are less than one meter.

4. The cable according to claim 2, wherein the short distances are in the order of magnitude of the circumference of the cable or less.

5. The cable according to claim 1, wherein said detectable substance is water.

6. The cable according to claim 1, wherein the structured material comprises swellable material.

7. The cable according to claim 1, wherein the structured material comprises self-adhesive material, wherein the adhesive is on at least one side of the self-adhesive material.

8. The cable according to claim 1, wherein said structured material comprises at least one first tape helix shaped wound around the inner cable sheath.

9. The cable according to claim 8, wherein said structured material comprises at least one additional tape.

10. The cable according to claim 9, wherein the at least one additional tape is helix shaped wound around the inner cable sheath with an opposite spinning direction to that of the first tape.

11. The cable according to claim 9, wherein the at least one additional tape is mainly longitudinally arranged on said inner cable sheath.

12. The cable according to claim 1, wherein said structured material comprises a sputtered adhesive and sealing material.

13. The cable according to claim 12, wherein said structured material comprises at least one tape and one stripe shaped sputtered adhesive material.

14. The cable according to claim 13, wherein one of said tape and stripe shaped sputtered materials is longitudinally arranged.

15. The cable according to claim 13, wherein at least one of said tape and stripe shaped sputtered materials is helically shaped.

16. The cable according to claim 15, wherein one of said tape and stripe shaped sputtered materials is longitudinally arranged.

17. The cable according to claim 1, wherein said structured material comprises sputtered adhesive and sealing material divided in at least two stripe shape sections side by side around the perimeter of the inner cable sheath with changing distance to each other along the cable and formed as a short longitudinally arranged section when connected to each other.

18. The cable according to claim 1, wherein said cable is a power cable.

19. The cable according to claim 1, wherein said cable is a copper telecom cable.

20. The cable according to claim 1, wherein said cable is a fibre optics cable.

* * * * *